3,047,481
METHOD OF PRODUCING OXIMES OF ALICYCLIC KETONES

Kurt Kahr, Chur, Graubunden, Switzerland, assignor to Inventa A.G. für Forschung und Patentverwertung, Lucerne, Switzerland
No Drawing. Filed Dec. 9, 1957, Ser. No. 701,329
8 Claims. (Cl. 204—162)

The present invention relates to a method of producing oximes of alicyclic ketones also called alicyclic ketoximes.

The invention is concerned with a process of producing oximes of alicyclic ketones, and is characterized by the fact that a mixture of nitrogen monoxide and nitrogen dioxide and hydrochloric acid gas are permitted to react on the corresponding saturated alicyclic hydrocarbons in the presence of active light.

Conversion to oximes can be carried out in the presence of active light by means of agents producing a nitrosifying effect, such as nitrosyl chloride, nitrosyl bromide, nitrosyl sulphuric acid et al. Not only do these nitrosifying agents require a considerable expenditure for their production but they also require as initial product either pure nitrogen monoxide or nitrogen dioxide. These gases are obtained from the nitrites or nitrates by conversion with mineral acids or from the gases of combustion of ammonia through separation of the nitrogen monoxide from nitrogen dioxide.

When the nitrosifying agents react upon saturated hydrocarbons, they form in addition to the oximes considerable quantities of secondary products, which heretofore have rendered impossible the industrial practice of the process. Thus as by-products, for example, in the conversion with cyclohexane, 1-chlornitrosocyclohexane, chlorocyclohexane and high-boiling, resinous, dark-colored products are formed that settle particularly on the glass wall of the source of light, impair the light reaction and check further conversion. For the avoidance of the formation of resinous secondary products, it has been proposed to carry out the nitrosification by means of nitrosyl chloride in the presence of aliphatic carbonic acids or their halogenized derivatives.

It has been found in accordance with the present invention that oximes can be produced industrially in a simple and economically feasible manner direct from the saturated alicyclic hydrocarbons, if with them, a mixture of nitrogen monoxide and nitrogen dioxide as well as hydrochloric acid gas are allowed to react in the presence of active light. In this case, only extremely slight quantities of by-products are formed, so that the process can be carried out continuously and on an industrial scale.

In the process, according to the invention, the combustion gases of the ammonia, as they are obtained for example for the production of nitric acid, can be used directly without separating the nitrogen oxides from the inert gases present in the air employed in the combustion and from excess oxygen. The oximes are then obtained in the form of a hydrochloric acid and hydrous solution of light color and are nearly free from organic by-products, so that there is no need for any purification in the further processing, thus for example by Beckmann's rearrangement into lactam. The oximes of the present invention are useful in producing lactams by such rearrangement.

The saturated alicyclic hydrocarbons which may be used for the purpose of the present invention are all cycloaliphatic compounds with more than 4 carbon atoms in the molecule, for example cyclopentane, cyclohexane, cycloheptane, cyclooctane, their homologues as well as higher membered hydrocarbons. The conversion is conducted by filling with the hydrocarbon a reaction vessel provided with a cooling installation and by immersing therein a source of light, for example a water-cooled mercury high-pressure tube lamp. During exposure to light, the mixture of nitrogen oxides and hydrochloric acid gas is conducted finely divided through the alicyclic hydrocarbon liquid or dissolved in inert aromatic hydrocarbon. After a certain time, the specifically heavier hydrochloric acid and hydrous oxime solution separates at the bottom. The unconverted cyclohexane layer is of a color practically as clear as water and contains only extremely slight quantities of chlorination products and resinous constituents. The gases passing off from the reaction vessel contain hydrochloric acid and incompletely converted reaction products that can be used again for further conversion, if need be after separation of existing inert gases, and conveyance of fresh nitrous oxides for the reaction.

Instead of using a mercury lamp, use can also be made of a mixed light lamp (a lamp, e.g. an ordinary incandescent lamp, which emits ultraviolet, visible, and infrared rays) or of some other source of light with photochemically effective rays. It is advantageous, however, to eliminate the very short-waved rays, for the reason that they promote the formation of by-products. To good advantage, these lamps are provided with a light-transmissive cooling water jacket to reduce the heat discharged.

The combustion gases of the ammonia with air can be used in a concentration of approximately 9–12% of nitrogen oxides and these gases including the inert gases may be used directly for the conversion with the alicyclic hydrocarbons. The residual oxygen still present present in these gases would advantageously have to lead only up to half reoxidation of the nitrogen monoxide. The duration of the combustion gases up to the time of use in the reaction is to good advantage to be so chosen that the degree of oxidation of the nitrogen oxides should come up to only about 50%. The combustion of the ammonia with oxygen is effected for example in the presence of water vapor or other inert gases or vapors that serve for the dilution of the oxygen. Particularly, the combustion of the ammonia that is carried out with water vapor and oxygen yields gases containing nitrous oxide which upon conversion with hydrocarbons in the presence of hydrochloric acid produce very pure oximes and practically no by-products.

The hydrochloric acid gas that is used in the conversion into oxime can either be combined with the nitrous gases prior to the introduction into the alicyclic hydrocarbons or be conveyed separately to the reaction solution. If the nitrous gases and the hydrochloric acid gas are conveyed to the liquid hydrocarbon at separate places, very light-colored solutions are obtained practically without by-products. The quantity of hydrochloric acid gas used for the conversion should be gauged in such a way that it should be adequate for the reduction of the nitrogen dioxide. The reduction water forming when the hydrochloric acid gas is conducted together with the nitrous gases prior to the conversion with the hydrocarbons can be separated, but this is not absolutely essential. When use is made of only slight quantities of hydrochloric acid gas, the oxime precipitates as hydrochloride in the hydrocarbon during the reaction in the form of flakes, which can be separated right along by filtration from the product of reaction. It is only in the case of a large excess, which in relation to the pure nitrogen oxides can be used up to about 10-fold the quantity in volume, that the separation of the oxime comes about as a solution in concentrated aqueous hydrochloric acid. The content of water of the hydrochloric acid-oxime solution comes to about 5–15%. The use of excess hydrochloric acid gas is particularly advantageous for the reason that the oxime-hydrochloric acid solution becomes quickly separated as a result of its great specific density. The conversion under normal circumstances is carried out at normal pressure, but it can also be conducted at increased pressure. To good advantage, the temperature of reaction should not be in excess of 60° C. and advisably it should range between 5 and 30° C. Obviously enough, the reaction can also be carried out at low temperatures. In such event, it is necessary in most instances to lower the point of solidification by dilution, for example, by addition of aromatic hydrocarbons not capable of reaction. The process according to the invention is capable of being executed simply in continuous manner, i.e. in such a way that the oximes or their solution are steadily separated from the reaction mixture and some of the unconverted hydrocarbons are drawn off from the reaction mixture for the removal of any by-products, for example, by distillation if need be, in conjunction with an adsorption or absorption and after the purification thereof are reconducted into the reaction zone.

The isolation of the oximes from the hydrochloric acid solutions is effected in a simple manner by saturation of the acid with hydroxides of alkali and alkaline earth, their carbonates or other acid-uniting agents, as well as separation of the oximes, for example by extraction with the initial hydrocarbons or other appropriate solvents.

The conversion into oximes in relation to the employed half mixture of nitrogen monoxide and nitrogen dioxide comes to 50–60% when the distribution of the gases is thorough and the gases go through in a single pass and it can be further heightened by subsequent passages.

The ensuing examples are not confined to the hydrocarbons cited but can be used on also all other saturated alicyclic hydrocarbons.

Example 1

250 ml. of cyclopentane are filled into a cylindrical vessel having a capacity of 300 ml. and having a sharply drawn out bottom and drain cock, which is provided with a double-glass jacket for cooling with water. There are then conducted together hourly 5 liters of hydrochloric acid gas and 1.5 liters of a mixture which consists half of nitrogen monoxide and half of nitrogen dioxide with a content of 20% nitrogen and which was derived from an ammonia combustion with the aid of water vapor and oxygen at 700° C. By cooling, a slight quantity of water is separated from the gas mixture and the latter finely divided is introduced with the aid of a batch of glass through the layer of cyclopentane at a temperature of 15° C. The waste gases are cooled by a return-flow cooler charged with cooling brine. The reaction mixture is illuminated by an immersed mixed light lamp of 500 watts. After three hours, there will be settled at the bottom of the reaction vessel a hydrochloric acid solution of the cyclopentane oxime which is separated, neutralized with dilute soda solution and extracted with ether: from the ethereal solution after evaporation of the ether, there is obtained a residue of 8 g. of a cyclopentane oxime colored weakly yellowish and having a melting point of 56° C.

Example 2

1800 ml. of cyclohexane are filled into a cylindrical glass vessel having a length of 40 cm. and a capacity of approximately 2000 ml. and having a conical bottom and delivery cock, into the lower part of which is built a three-part glass batch for the conveyance of gas. Into the reaction vessel is immersed from up high a high-pressure mercury tube lamp having a length of about 25 cm. and an output of 80 watts. The immersing lamp is surrounded by two unilaterally sealed pyrex glass tubes, between which water flows for cooling. From the top through a glass batch reaching all the way into the lower portion of the reaction vessel, 10 liters of hydrochloric acid gas are conducted hourly and then 10 liters of 9% nitrous gases from the combustion of ammonia and air with an oxidation degree of 45% are allowed to flow hourly through the installed three-part batch under influence of light. The temperature of reaction is 22° C. The waste gases pass a return-flow cooler cooled with cooling brine. After six hours, about 25 ml. of practically colorless hydrochloric acid-cyclohexanone oxime solution will have separated at the lower portion of the reaction vessel. After separation and neutralization of this layer with dilute soda lye and extraction with cyclohexane, 15.5 g. of pure cyclohexane oxime is obtained with a melting point of 88° C.

After neutralization of the unconverted cyclohexane containing hydrochloric acid with soda lye and distillation, only 0.3 g. of 1-chlornitrosocyclohexane would be obtained as residue.

What is claimed is:

1. A process of producing an oxime of an alicyclic ketone containing more than four carbon atoms in the molecule which comprises reacting the corresponding saturated alicyclic hydrocarbon in the presence of active light with a crude gaseous mixture derived from ammonia combustion with an oxygen-containing gas and comprising 9% to 12% of nitrogen oxides at least half of which consists of NO and the remainder of which consists of $NO_2$ produced by residual oxygen still present in the ammonia combustion gas, and with hydrochloric acid gas in a molar ratio such that $NO_2$:HCl is greater than 1:2 and not greater than 1:20.

2. A process as set forth in claim 1 wherein said oxygen-containing gas is air.

3. A process as set forth in claim 1 wherein the amount of hydrochloric acid gas is by volume in sufficient excess of the amounts of the oxides of nitrogen to provide a solution of oxime in concentrated aqueous hydrochloric acid which will separate from the reaction mixture because of its great specific density.

4. The process as described in claim 1, wherein the nitrogen oxides of the mixture, on the one hand, and the hydrochloric acid gas, on the other hand, are made to react separately upon the alicyclic hydrocarbon.

5. The process as described in claim 1, wherein the waste gases from the process containing hydrochloric acid and reaction products not totally converted are employed with fresh nitrous oxides to effect reaction by which more oxime is produced.

6. The process as described in claim 1, wherein the process is carried out continuously by drawing from the reaction mixture a hydrochloric acid oxime solution, drawing from the reaction zone a quantity of unconverted hydrocarbon with by-products, removing the by-products from the drawn unconverted hydrocarbon and returning the unconverted hydrocarbon so freed of by-products with fresh alicyclic hydrocarbon to the reaction zone.

7. The process as described in claim 1, wherein the alicyclic hydrocarbon is cyclopentane.

8. The process as described in claim 1, wherein the alicyclic hydrocarbon is cyclohexane.

References Cited in the file of this patent

UNITED STATES PATENTS

| | | |
|---|---|---|
| 2,818,380 | Welz | Dec. 31, 1957 |
| 2,879,215 | Reppe et al. | Mar. 24, 1959 |
| 2,885,332 | Mueller et al. | May 5, 1959 |

FOREIGN PATENTS

| | | |
|---|---|---|
| 992,772 | France | July 11, 1951 |

OTHER REFERENCES

Chemical Reviews, vol. 48 (1951), page 324.
Jacobsen: Encyclopedia of Chemical Reactions, vol. 5, 1953, page 203.